Patented June 15, 1937

2,083,692

UNITED STATES PATENT OFFICE 2,083,692

PRODUCTION OF FERRIC CHLORIDE

Kurt William Freddy Dorph and Maurice C. Taylor, Niagara Falls, N. Y., assignors to The Mathieson Alkali Works, Inc., New York, N. Y., a corporation of Virginia No Drawing. Application August 15, 1934, Serial No. 739,937

6 Claims. (Cl. 23—87)

This invention relates to improvements in the production of ferric chloride, $FeCl_3$, and includes, as one step, a chlorination of mixtures of ferrous chloride and iron and, as a combined operation, a chlorination of iron to produce ferrous chloride followed by chlorination of the ferrous chloride thus produced in admixture with iron.

If iron, in an appropriate state of division, is chlorinated at atmospheric pressure, the temperature of the reaction mixture increases rapidly until a temperature of about 800°–1000° C. is attained. Since the dissociation pressure of ferric chloride approximates atmospheric pressure at a temperature of 600° C., the reaction product consists almost entirely of ferrous chloride, $FeCl_2$, including very little, if any, ferric chloride. The melting point of ferrous chloride approximating 670° C., the ferrous chloride thus produced is recovered as a fusion.

Difficulties with respect to temperature control have made it difficult, if not impossible, as a practical matter, to produce ferric chloride by direct chlorination of iron. This invention, however, provides a means of temperature control which makes possible the direct production of ferric chloride by a two-step chlorination of iron.

In accordance with this invention, ferric chloride is produced by chlorination, at an appropriately limited temperature, of a mixture of ferrous chloride and iron, the ferrous chloride being produced for example by chlorination of iron at high temperature, the temperature of the chlorination of the mixture of ferrous chloride and iron being controlled by regulation of the proportions of iron present during this chlorination. The chlorination of the mixture of ferrous chloride and iron is carried on at a temperature above 150° C., the ferric chloride produced being recovered from the reaction mixture by distillation, and below the melting point of ferrous chloride, or better below about 600° C., a temperature approximating 400°–450° C. being advantageous. The temperature is maintained within these limits by appropriately proportioning the ferrous chloride and the iron constituting the mixture chlorinated, a mixture of ferrous chloride and iron in proportions of about 20:1 (by weight) being advantageous for the range 400°–450° C. Chlorination of the iron present in the mixture supplies the heat to maintain the reaction temperature and the evaporation of ferric chloride limits the temperatures attained by absorption of heat. The chlorination can thus be expeditiously effected at temperatures such that dissociation of ferric chloride formed is negligible, making possible high recoveries of ferric chloride.

Chlorination of the mixture of ferrous chloride and iron, in accordance with this invention, can be carried on in apparatus of conventional type. Proportioning of the mixture is, to some extent, dependent upon the apparatus used, an increased proportion of iron being useful when using apparatus in which the rate of dissipation of heat from the reaction vessel is relatively high, and vice versa. Increasing the proportion of iron in the mixture of ferrous chloride and iron chlorinated increases the reaction temperature and decreasing the proportion of iron decreases the reaction temperature.

In the combined operation of the invention, a fusion of ferrous chloride is produced by chlorination of iron at a temperature, for example, of 800°–1000° C., or better 800°–900° C., at atmospheric pressure, the fusion is solidified by cooling and crushed, for example, to 3–4 mesh, this ferrous chloride is mixed with iron in a similar state of division to form a mixture consisting, for example, of 95–96% ferrous chloride and 5–4% iron, and the mixture is chlorinated at a temperature of about 400°–450° C.

The following specific example of chlorination of a mixture of ferrous chloride and iron in accordance with the invention will further illustrate the invention: Ferrous chloride and iron, subdivided to pass a 3–4 mesh screen, are intimately mixed in proportions of about 4.17 pounds of iron per 100 pounds of ferrous chloride. The mixture is heated to 400°–450° C. in a reaction vessel to which chlorine is supplied when the reaction temperature has been attained. The chlorination proceeds at a temperature of about 400° C., ferric chloride having a boiling point of 315°–317° C. being recovered from a condenser to which it passes from the reaction vessel as a vapor. The reaction vessel is not extraneously heated during the chlorination. When the reaction is completed, the temperature drops rapidly.

The chlorination of the mixture of ferrous chloride and iron may be carried on, in accordance with this invention, at temperatures as low as 150° C. if a distillation medium is used to effect recovery of the ferric chloride produced by distillation. Even below the melting point of ferric chloride, ferric chloride has a relatively high vapor pressure, a vapor pressure high enough at temperatures above about 150° C. to make possible the recovery of ferric chloride from the reaction vessel. The chlorination will proceed at temperatures upwards of about 150° C.

If, in carrying out the chlorination of the mixture of ferrous chloride and iron, the reaction temperature falls too low, a residue containing varying proportions of ferrous chloride and ferric chloride, sometimes consisting almost entirely of ferric chloride, is obtained. Such residues can be recovered by being chlorinated with additional quantities of ferrous chloride and iron in subsequent chlorinations.

We claim:

1. In the production of ferric chloride, the improvement which comprises chlorinating a dry mixture of ferrous chloride and iron, in proportions of about 20:1, at a temperature above the boiling point of ferric chloride and below the melting point of ferrous chloride and maintaining said temperature solely by exothermic heat of reaction.

2. In the production of ferric chloride, the improvement which comprises chlorinating a dry mixture of ferrous chloride and iron, in proportions of about 20:1, at a temperature above 150° C. and below 600° C. and maintaining said temperature solely by exothermic heat of reaction.

3. In the production of ferric chloride, the improvement which comprises chlorinating iron at a temperature below the boiling point of ferrous chloride which will form a fusion of ferrous chloride, forming a dry mixture of the ferrous chloride thus produced, after solidification, with iron and chlorinating the mixture at a temperature above the boiling point of ferric chloride and below the melting point of ferrous chloride and maintaining said temperature solely by exothermic heat of reaction.

4. In the production of ferric chloride, the improvement which comprises chlorinating iron at a temperature below the boiling point of ferrous chloride which will form a fusion of ferrous chloride, forming a dry mixture of the ferrous chloride thus produced, after solidification, with iron and chlorinating the mixture at a temperature approximating 400°–450° C. and maintaining said temperature solely by exothermic heat of reaction.

5. In the production of ferric chloride, the improvement which comprises chlorinating iron at a temperature below the boiling point of ferrous chloride which will form a fusion of ferrous chloride, forming a dry mixture of the ferrous chloride thus produced, after solidification, with iron, in proportions of about 20:1, and chlorinating this mixture at a temperature above the boiling point of ferric chloride and below the melting point of ferrous chloride and maintaining said temperature solely by exothermic heat of reaction.

6. In the production of ferric chloride, the improvement which comprises chlorinating iron at a temperature of about 800°–1000° C. to form a fusion of ferrous chloride, forming a dry mixture of the ferrous chloride thus produced with iron, and chlorinating the mixture at a temperature of about 150°–600° C. and maintaining said temperature solely by exothermic heat of reaction.

KURT WILLIAM FREDDY DORPH.
MAURICE C. TAYLOR.